United States Patent [19]

Boman

[11] 3,979,030
[45] Sept. 7, 1976

[54] APPARATUS FOR DISPENSING POURABLE SUBSTANCES UNIFORMLY ONTO BELTS HAVING HIGHLY SENSITIVE SURFACES

[75] Inventor: Karl Gunnar Boman, Neckarrems, Germany

[73] Assignee: Sandco Ltd., Canada

[22] Filed: Oct. 9, 1973

[21] Appl. No.: 404,386

[30] Foreign Application Priority Data
Oct. 11, 1972 Germany............................ 2249632

[52] U.S. Cl.................................. 222/415; 277/135
[51] Int. Cl.² ............................................. B60P 1/38
[58] Field of Search................. 277/135, 68, DIG. 1; 222/371, 415

[56] References Cited
UNITED STATES PATENTS

| 2,584,513 | 2/1952 | Summers.......................... 277/135 J |
| 2,756,459 | 7/1956 | Kellner .......................... 222/415 X |
| 2,940,644 | 6/1960 | Crane ............................. 222/371 X |
| 2,954,244 | 9/1960 | Austin................................ 277/135 |

*Primary Examiner*—Stanley H. Tollberg
*Attorney, Agent, or Firm*—Craig & Antonelli

[57] ABSTRACT

An apparatus for dispensing viscous, pourable substances onto belts having highly sensitive surfaces, especially for dispensing a uniformly thick layer of polymer resins onto a steel belt. Provided for this purpose is a storage box having an open bottom, in which the bottom edge of at least one of the end walls located at right angles to the direction of travel of the belt is arranged just above the surface of the belt in such a manner that it does not contact the surface of the belt. Sealing is provided by means of flows of gas or liquid, which are directed at the gap between the bottom edge of the side wall and the surface of the belt from the outside, and whose pressure retains the viscous substance in the storage box.

51 Claims, 4 Drawing Figures

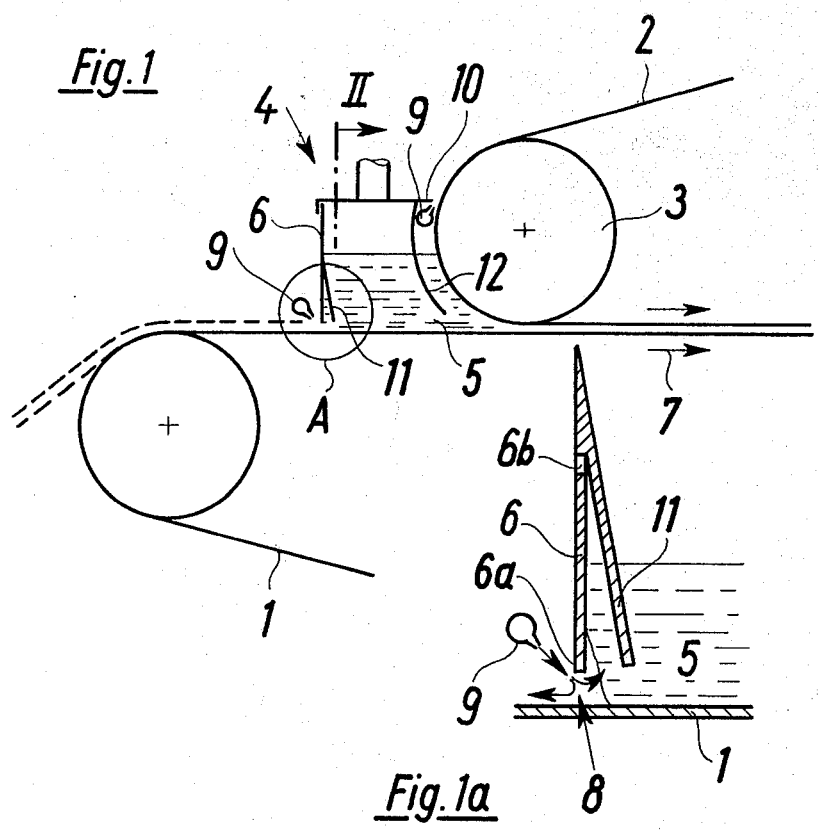
Fig.1
Fig.1a
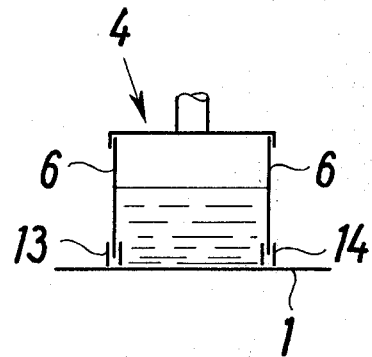
Fig.3
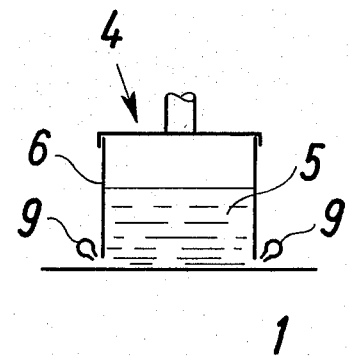
Fig.2

APPARATUS FOR DISPENSING POURABLE SUBSTANCES UNIFORMLY ONTO BELTS HAVING HIGHLY SENSITIVE SURFACES

The present invention relates to an apparatus for dispensing viscous pourable substances uniformly onto belts having highly sensitive surfaces, especially for dispensing polymer resins onto a steel belt, comprising a storage box having a discharge opening for the product to be dispensed.

There are a number of applications in which viscous substances must be dispensed onto rotating steel belts, for example, in order to then be subjected to either further processing or a chemical curing process, etc. Discharge containers arranged over the belts are known for this purpose; these containers have a slot-like discharge opening which permits the substance to be dispensed onto the belt to flow out in the desired thickness. Facilities of this type have the disadvantage that they can only be employed for relatively viscous substances which can be calibrated in the desired manner as they egress from the discharge opening.

Also known in the fabrication of acrylic glass is leading the mass which is dispensed onto a belt from a discharge container between two downwardly extending steel belts in order to be able to calibrate its thickness in this manner. However the disadvantage here is that the downward inclination of the belts must be in a precise angle in order to ensure that the still liquid acrylic glass mass is led between the belts without bubbles. Moreover, the height of facilities of this type is excessive due to the transport paths necessary as a result of the length which is required for curing the masses. Above all, conversion for handling other products is not readily possible in this manner.

The object of the invention is to avoid these disadvantages and to create a dispensing apparatus which ensures that the highly sensitive surfaces of the belts, which can be impaired through any mechanical effect, especially in the fabrication of acrylic glass, are not damaged, while, on the other hand, permitting the product to be dispensed onto the belt irrespective of its viscosity. According to the invention, the storage box consists only of side walls located directly adjacent to the surface of the belt, and at least the bottom edge of the side wall located at right angles to the direction of travel of the belt is arranged just above the surface of the belt and sealed by a flow of gas or liquid directed at the gap between the bottom edge and the surface of the belt from the outside. In this embodiment, the substance to be dispensed can be dispensed directly onto the belt, with its outflowing thickness being determined by the level within the storage box, without endangering the sensitive surfaces of the receiving belt, which, according to the invention, are protected against any and all mechanical sealing. It has been shown that the new sealing means can be realized very well, especially with viscous substances, and that there is no significant risk of the substance egressing from the storage box.

It is also possible for the bottom edges of all side walls of the storage box to be sealed by means of flows of liquid. However, it is also possible for those side walls extending in the direction of travel of the belt to rest on the surface of the belt and be provided with a labyrinth seal. While these side walls, located at either edge of the belt, will score the surface of the belt, this will not have any detrimental effects on the product, as this scoring will not be located in the area of the surface of the acrylic glass mass which is to be hardened, for example.

It is advantageous for the insides of the side walls to have intercepting walls for any sealing medium which may penetrate into the interior of the storage box, and, for employing sealing flows having a density which is less than the substance to be dispensed, i.e. for sealing with flows of air, for example, it is also possible for the intercepting walls to be inclined upwardly toward the side walls, which have outlet openings for sealing medium which may have penetrated into the interior. This prevents the product to be dispensed from being impaired by any sealing medium which may possibly penetrate into the interior.

For a facility with two rotating belts, which run in the same direction in the area in which the belts face each other, especially for a double belt press, it has been shown to be especially advantageous if the end of the storage box is arranged in front of the reversing roll of the upper belt and is also sealed off from the surface of the upper belt with sealing flows in the area of the lid, extending at right angles to the upper belt. In this embodiment, the storage box can also be equipped with means for regulating the level of liquid in its interior, permitting very simple determination of the static pressure of the mass flowing between the two belts, which can then be selected in such a manner that bubblefree, perfect surfaces can be achieved in the fabrication of acrylic glass, for example.

The above discussed and other objects, features and advantages of the present invention will become more apparent from the following practical example thereof, when taken in connection with the accompanying drawings in which FIG. 1 shows a schematic representation of a longitudinal section through the dispensing apparatus according to the invention for a double belt facility;

FIG. 1a shows an enlarged representation of detail A in FIG. 1;

FIG. 2 shows the cross section through FIG. 1 in the direction of arrow II; and

FIG. 3 shows a cross section similar to FIG. 2, however through another embodiment of the dispensing apparatus according to the invention.

Referring now to the drawings, FIG. 1 shows two rotating endless belts 1 and 2, each having a highly polished and highly sensitive surface, and being designed as steel belts for example. The two belts 1 and 2 rotate in such a manner that, in the area where both belts face each other, they travel in the same direction at the same speed. Not illustrated are the supporting means for the two belts 1 and 2, which ensure that equal clearance is maintained between the belts. Arranged in front of reversing roll 3 of upper belt 2 is a storage box 4, whose interior contains the product to be dispensed onto the lower belt 1, for example liquid acrylic glass 5. Storage box 4 does not have a bottom; its side walls 6 are arranged directly above lower belt 1 in such a manner that at least the bottom edge 6a of end wall 6, extending at right angles to the direction of travel 7 of the lower belt and illustrated in FIG. 1, is located just above the polished surface of lower belt 1, while not contacting this surface. In order to prevent the liquid acrylic glass mass from egressing out of the gap 8 between the surface of the belt and the bottom edge 6a of end wall 6, air outlet nozzles 9 are arranged in front of end wall 6, which can be slot-shaped, and direct flows of air against gap 8 in such a manner that the liquid acrylic glass is prevented from egressing out of the gap. Instead of employing air as a sealing medium, it would also be possible to use a liquid or another gas. Of significance is only that end wall 6 does not contact the surface of the belt, thereby eliminating any possibility of damage to the surface through mechanical contact. A seal functioning on the same basic principle is also provided at the end edge of the lid 10 of storage box 4 facing reversing roll 3.

In order to prevent air bubbles from penetrating into the acrylic glass mass in the practical example shown, and resulting in undesired contamination of the acrylic glass, intercepting walls 11 and 12 are provided in the area of the bottom edges and in the area of the edges of end wall 6 and lid 10 which must be sealed. These intercepting walls 11 and 12 ensure that any air bubbles which may enter are collected in the space between intercepting walls 11 and end wall 6 or between wall 12 and lid 10, from where they can be removed from the storage box again through unillustrated ventilation openings.

As shown in FIG. 2, the bottom edges of those side walls 6 arranged in the direction of travel 7 of the belt can also be sealed by means of flows of air or liquid, egressing from nozzles 9. However, as shown in FIG. 3, it is also possible to mount these side walls on the surface of the belt by means of labyrinth seals 13 and 14, as damage to the surface of the belt through scoring is not detrimental in this area, as no acrylic glass surface is formed in this area of the belt.

Of course, this new dispensing apparatus can also be employed for other purposes, and is not limited to applications in the field of acrylic glass fabrication. Other viscous masses, for example, polymers, etc., can also be handled with this new dispensing apparatus. However for handling acrylic glass, it provides the significant advantage that the static pressure of the product to be dispensed can be determined by means of level control means in a storage box 4, thereby ensuring a given pressure of the acrylic glass mass on the top and bottom belts, independently of the arrangement of belts 2 and 3, thus permitting perfect, bubble-free acrylic glass surfaces to be achieved.

Obviously, many modifications and variations of the present invention are possible in the light of the above teachings. It should therefore be understood that within the scope of the appended claims, the invention may be practiced otherwise than as specifically described.

Having thus fully disclosed my invention, what I claim is:

I claim:

1. An apparatus for dispensing viscous, pourable substances uniformly onto belts having highly sensitive surfaces, especially for dispensing a uniform layer of polymer resins onto a steel belt, comprising a storage box which is open at the bottom and consists only of side walls which are located directly adjacent to the surface of the belt and in which at least the bottom edge of the end wall located at right angles to the direction of travel of the belt is arranged just above the surface of the belt and sealed by means of a flow of gas or liquid directed at the gap between the bottom edge and the surface of the belt from the outside.

2. The apparatus according to claim 1, wherein the bottom edges of all side walls of said storage box are sealed by means of flows of liquid.

3. The apparatus according to claim 1, wherein those side walls arranged in the direction of travel of the belt rest on the surface of the belt and have labyrinth seals, and in which only the bottom edges of those side walls extending at right angles to the direction of travel of the belt are sealed with flows of liquid.

4. The apparatus according to claim 1, wherein the insides of said side walls have intercepting walls for receiving any gas or liquid directed at said gap which may penetrate into the interior of the storage box.

5. The apparatus according to claim 4 for the employment of a gas or liquid sealing medium having a density which is less than that of the substance to be dispensed, wherein said intercepting walls are inclined upwardly and toward the side walls, said side walls having outlet openings for sealing medium which may have penetrated into the interior.

6. An apparatus for dispensing a viscous, pourable substance uniformly onto belts having highly sensitive surfaces, especially for dispensing a uniform layer of polymer resins onto a steel belt, comprising two rotating belts and a storage box for containing said pourable substance, said storage box being open at the bottom and consisting only of a lid and side walls located directly adjacent to the surface of one of said belts and in which at least the bottom edge of the end wall located at right angles to the direction of travel of said one belt is arranged just above the surface of the belt and sealed by means of the flow of a gas or liquid directed at the gap between the bottom edge and the surface of said one belt from the outside, said two rotating belts positioned to travel in the same direction in an area in which the two belts face each other, the end of said storage box being arranged in front of the reversing roll of the upper belt, said storage box being sealed from the surface of the upper belt with the flow of a gas or liquid in the area of the lid, said lid extending at right angles to the upper belt.

7. The apparatus according to claim 6, in which said storage box has means for regulating the level of said pourable substance in its interior.

8. The apparatus according to claim 6, wherein intercepting walls for sealing medium from the sealing flows which may have penetrated into the interior of the storage box are provided on the insides of the side walls.

9. The double belt press according to claim 8 for the employment of a gas or liquid sealing medium having a density which is less than that of the substance to be dispensed, in which said intercepting walls are inclined upwardly and toward the side walls, and in which outlet openings are provided in the side walls for sealing medium which may have penetrated between said intercepting walls and the side walls and collected there.

10. The double belt press according to claim 8 for the employment of a gas or liquid sealing medium having a density which is less than that of the substance to be dispensed, wherein said intercepting walls are inclined upwardly and toward the side walls, and further wherein outlet openings are provided in the side walls for sealing medium which may have penetrated between said intercepting walls and the side walls.

11. The apparatus according to claim 1, in which the bottom edge of the end wall located at right angles to the direction of travel of the belts and oppositely of the outlet slot of the storage box is arranged just above the surface of the belt and sealed by means of the flow of gas or liquid directed at said gap.

12. Apparatus for the uniform feeding of a viscous, pourable substance onto a belt having a highly sensitive surface, especially for the feeding of a polymeric resin onto a steel belt, comprising:
- a storage bin open at the bottom, the walls of which terminate shortly above the surface of the belt, said bin defining an outlet slot for the material to be fed adjacent said belt and disposed at right angles to the direction of the travel of said belt, said bin further defining a gap between the lower edge of the end wall of said bin disposed oppositely to said slot and the surface of said belt, and
- means for producing a gas or liquid jet directed at said gap for preventing the flow of said pourable substance therethrough.

13. The apparatus according to claim 12, wherein said means for producing a gas or liquid jet is a nozzle.

14. The apparatus according to claim 13, wherein the side walls of said storage bin extending in the travel direction of the belt and said belt define longitudinal gaps therebetween, said apparatus further comprising means for directing a gas or liquid jet at said longitudinal gaps for preventing the flow of said pourable substance therethrough.

15. The apparatus according to claim 12 further including an intercepting wall for collecting gas or liquid penetrating from said jet into the interior of the storage bin, said intercepting wall connected to said end wall.

16. The apparatus according to claim 15, wherein said intercepting wall is inclined in an upward direction toward said end wall and provided with outlet openings whereby gas or liquid having a lower specific gravity than said pourable substance can be collected and removed from said storage bin.

17. The apparatus according to claim 12, wherein said belt having a highly sensitive surface is a horizontally positioned first endless belt, said apparatus including a second horizontally positioned endless belt, said endless belts facing each other while running in the longitudinal direction, said storage bin being disposed with its end face in front of the upstream guide roller around which the upper endless belt passes, said storage bin including a cover extending transversely to the upper endless belt and defining therewith an upper gap, said apparatus further including means for directing a gas or liquid jet at said upper gap.

18. Apparatus for the uniform feeding of a pourable substance comprising:
- a moving belt;
- a storage bin including at least one transverse wall positioned transversely to the motion direction of said moving belt, said transverse wall and said moving belt defining therebetween a small gap; and
- means for producing a liquid jet directed at said gap for preventing efflux of said pourable substance through said gap.

19. The apparatus according to claim 18, wherein said transverse wall is located on the upstream side of said bin with respect to said motion direction.

20. The apparatus of claim 19, wherein said storage bin further includes at least one longitudinal wall extending in said motion direction, said longitudinal wall and said belt defining therebetween a gap, said apparatus further including longitudinal jet means for producing a liquid jet directed at said longitudinal gap.

21. The apparatus according to claim 20 further including an intercepting wall connected to said bin for collecting liquid from said jet means penetrating into the interior of the storage bin.

22. The apparatus according to claim 19, wherein said storage bin includes at least one longitudinal wall positioned in said motion direction, said apparatus further including at least one labyrinth seal for sealing said longitudinal wall and said belt.

23. The apparatus according to claim 19, wherein said belt is a horizontally positioned lower endless belt, said apparatus further including a horizontally positioned upper endless belt, said endless belts being parallel and facing each other in said motion direction, said endless belts being guided by guide rollers, the upstream guide roller of said upper belt forming at least one wall of said storage bin whereby said pourable substance is retained in said bin and thereafter metered onto said lower endless belt by said upper endless belt passing around said guide roller.

24. The apparatus according to claim 23, wherein said storage bin includes a cover, said cover defining with said endless belt as it passes around said guide roller an upper gap, said apparatus further including upper jet means for producing liquid jet directed at said upper gap.

25. The apparatus of claim 19, wherein said storage bin further includes at least one longitudinal wall extending in said motion direction, said longitudinal wall and said belt defining therebetween a gap, said apparatus further including longitudinal jet means for producing a gas jet directed at said longitudinal gap.

26. The apparatus of claim 23, wherein said storage bin includes a cover, said cover defining with said endless belt as it passes around said guide roller an upper gap, said apparatus further including upper jet means for producing a gas jet directed at said upper gap.

27. Apparatus for the uniform feeding of a pourable substance comprising:
- a moving belt;
- a storage bin including at least one transverse wall positioned transversely to the motion direction of said moving belt, said transverse wall and said moving belt defining therebetween a small gap; and
- means for producing a gas jet directed at said gap for preventing efflux of said pourable substance through said gap.

28. The apparatus of claim 27, wherein said transverse wall is located on the upstream side of said bin with respect to said motion direction.

29. The apparatus of claim 28, wherein said storage bin further includes at least one longitudinal wall extending in said motion direction, said longitudinal wall and said belt defining therebetween a gap, said apparatus further including longitudinal jet means for producing a liquid jet directed at said longitudinal gap.

30. The apparatus of claim 28, wherein said storage bin further includes at least one longitudinal wall extending in said motion direction, said longitudinal wall and said belt defining therebetween a gap, said apparatus further including longitudinal jet means for producing a gas jet directed at said longitudinal gap.

31. The apparatus according to claim 30 further including an intercepting wall connected to said bin for collecting gas from said jet means penetrating into the interior of the storage bin.

32. The apparatus according to claim 28, wherein said storage bin includes at least one longitudinal wall positioned in said motion direction, said apparatus further including at least one labyrinth seal for sealing said longitudinal wall and said belt.

33. The apparatus according to claim 28, wherein said belt is a horizontally positioned lower endless belt, said apparatus further including a horizontally positioned upper endless belt, said endless belts being parallel and facing each other in said motion direction, said endless belts being guided by guide rollers, the upstream guide roller of said upper belt forming at least one wall of said storage bin whereby said pourable substance is retained in said bin and thereafter metered onto said lower endless belt by said upper endless belt passing around said guide roller.

34. The apparatus according to claim 33, wherein said storage bin includes a cover, said cover defining with said endless belt as it passes around said guide roller an upper gap, said apparatus further including upper jet means for producing a liquid jet directed at said upper gap.

35. The apparatus according to claim 23, wherein said storage bin includes a cover, said cover defining with said endless belt as it passes around said guide roller an upper gap, said apparatus further including upper jet means for producing a gas jet directed at said upper gap.

36. The apparatus according to claim 27 further comprising means for controlling the level of pourable substance in said storage bin.

37. The apparatus according to claim 27, wherein said means for producing a gas jet is a nozzle.

38. The apparatus according to claim 32, wherein said intercepting wall is inclined in an upward direction towards said end wall and provided with outlet openings whereby gas having a lower specific gravity than said pourable substance can be collected and removed from said storage bin.

39. The apparatus according to claim 18 further comprising means for controlling the level of pourable substance in said storage bin.

40. The apparatus according to claim 18, wherein said means for producing a liquid jet is a nozzle.

41. The apparatus according to claim 22, wherein said intercepting wall is inclined in an upward direction toward said end wall and provided with outlet openings whereby gas or liquid having a lower specific gravity than said pourable substance can be collected and removed from said storage bin.

42. The apparatus according to claim 1, wherein said flow of gas or liquid is produced by means of a nozzle.

43. The apparatus according to claim 42, wherein said gap communicates on one side with the interior of said storage box and on the other side with the outside of said apparatus.

44. The apparatus according to claim 1, wherein said gap communicates on one side with the interior of said storage box and on the other side with the outside of said apparatus.

45. The apparatus according to claim 12, wherein said gap communicates on one side with the interior of said bin and on the other side with the outside of said apparatus.

46. The apparatus of claim 18, wherein said gap communicates on one side with the interior of said bin and on the other side with the outside of said apparatus.

47. The apparatus according to claim 27, wherein said gap communicates on one side with the interior of said bin and on the other side with the outside of said apparatus.

48. The apparatus of claim 1, wherein said flow is produced by flow means spaced from said gap and mounted with respect to said gap such that said gas or liquid is unconfined after passing out of said flow means.

49. The apparatus according to claim 12, wherein said means for producing a gas or liquid jet is spaced from said gap and mounted with respect to said gap such that gas or liquid forming said jet is unconfined after passing out of said means for producing a gas or liquid jet.

50. The apparatus of claim 18, wherein said means for producing a liquid jet is spaced from said gap and mounted with respect to said gap such that liquid forming said jet is unconfined after passing out of said means for producing a liquid jet.

51. The apparatus of claim 27, wherein said means for producing a gas jet is spaced from said gap and mounted with respect to said gap such that gas forming said jet is unconfined after passing out of said means for producing a gas jet.

* * * * *